United States Patent [19]
Dalton

[11] 3,929,198
[45] Dec. 30, 1975

[54] TRACTOR-TRAILER PULLING AND GUIDING DEVICE

[76] Inventor: Harrison Lee Dalton, Rte. No. 1, Franklin, Tenn. 37064

[22] Filed: Apr. 29, 1974

[21] Appl. No.: 465,321

[52] U.S. Cl. .............................................. 180/14 A
[51] Int. Cl.² ........................................ B62D 59/02
[58] Field of Search .... 180/14 R, 14 A, 14 B, 53 R; 280/103

[56] References Cited
UNITED STATES PATENTS

| | | | |
|---|---|---|---|
| 1,527,333 | 2/1925 | Schellenger | 180/14 R |
| 1,698,724 | 1/1929 | Johnston et al. | 180/14 R |
| 1,999,841 | 4/1935 | MacGregor | 180/14 R |
| 2,903,080 | 9/1959 | Ritter | 180/14 B |
| 3,473,619 | 10/1969 | Dion | 180/14 R |
| 3,695,628 | 10/1972 | Fisher | 280/103 |

FOREIGN PATENTS OR APPLICATIONS

| | | | |
|---|---|---|---|
| 857,685 | 12/1970 | Canada | 180/14 R |
| 988,893 | 4/1965 | United Kingdom | 180/14 R |

*Primary Examiner*—M. H. Wood, Jr.
*Assistant Examiner*—John A. Pekar
*Attorney, Agent, or Firm*—Abe Hatcher

[57] ABSTRACT

An integral single-shaft drive unit for a truck cab-trailer combination or a tractor-wagon combination comprising from front to rear a power/ground take-off mechanism, an output shaft, a connecting sleeve, a first swivel-type coupling such as a universal joint, a telescopic shaft, a second swivel-type coupling, a pillow-block bearing, a third swivel-type coupling and rear-axle trailer or wagon differential. These parts are arranged in specific order such that a wagon or trailer behind a tractor or truck cab will turn evenly behind the tractor or truck cab and pull at the same speed or gear as the tractor or truck cab because of a single-chamber linkage between the power/ground take-off unit at the rear of the tractor or the truck cab and the differential between the two rear wheels of the wagon or trailer.

4 Claims, 1 Drawing Figure

U.S. Patent  Dec. 30, 1975  3,929,198
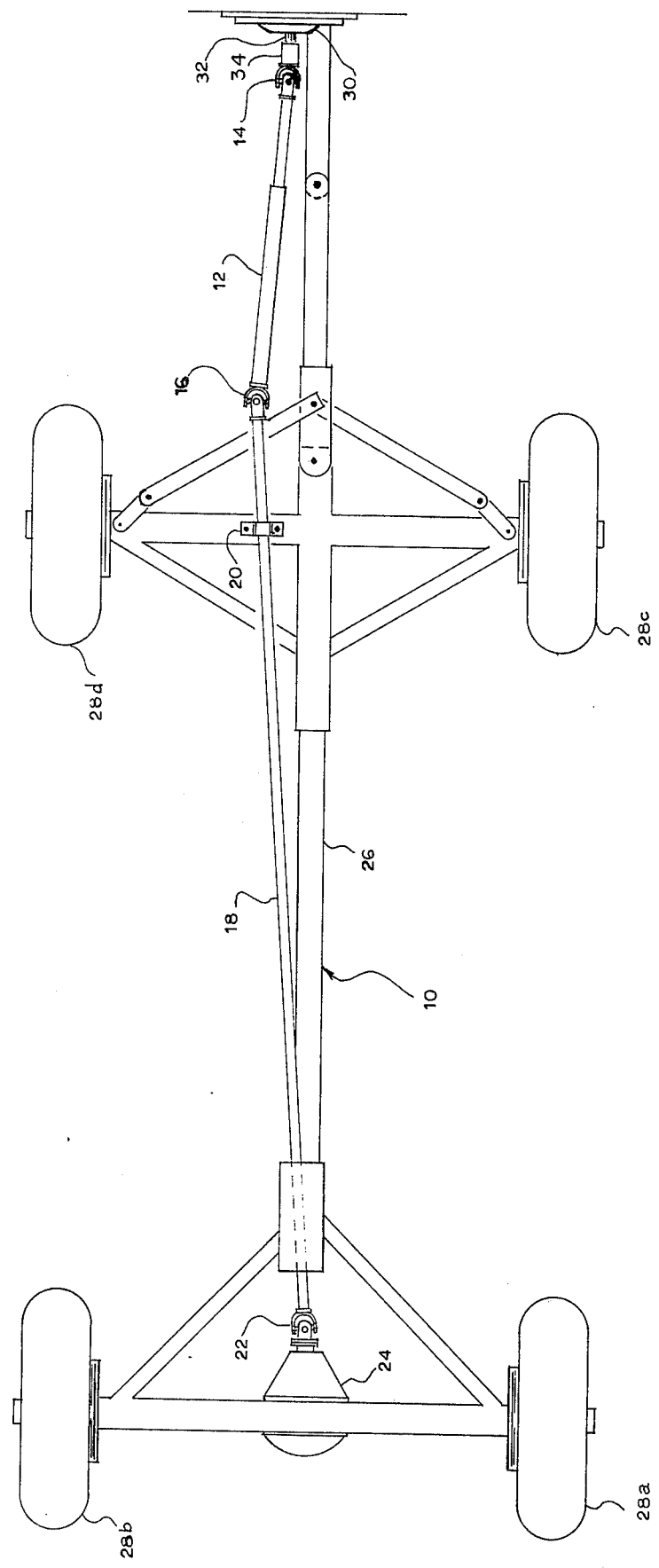

TRACTOR-TRAILER PULLING AND GUIDING DEVICE

BACKGROUND OF THE INVENTION

1. Field of the Invention

This invention relates to tractor-wagon or truck cab-trailer units. More particularly, it relates to apparatus for guiding and pulling a trailer or tractor behind a tractor or truck cab in a smooth and uniform manner.

2. Description of the Prior Art

Problems are often encountered, particularly on small farms, where the topography is rough, for example, in hauling logs from remote locations to paved roads or highways where they can be transported more readily be vehicles which do not have elaborate slow-turning devices. Such problems involve how to turn the wagon with the tractor, that is, as the tractor turns, where the contour of the land and the trailer path is crooked and curved between the location of the logging operation and the main highway. Also, there are difficulties often encountered in pulling a loaded wagon up a hill, probably at least partly because of having no drive means or differential for the wagon separate and apart from the tractor.

U.S. Pat. No. 3,473,619 of Dion presents one proposed solution to this problem but applies it and tells how to use it only for an articulated endless-track vehicle, that is, such as an army tank or a tractor. The method or drive of Dion involves use of a transmission box the outlet shaft of which is connected to an inner shaft of a reversing box. The reversing box has a first outlet shaft connected to a differential and connected to driving sprocket wheels of the endless track system of a driving unit and a second outlet shaft passing through the housing of a differential between two crown gears of the same and driving a second differential unit, the lateral shafts of which are connected to the driving sprocket wheels of the endless track system of a load-carrying unit. Dion's second driving line is provided with at least three universal joints. Obviously, such a device would not satisfy or solve the problems of the small farmer who routinely uses a tractor and a wagon to haul logs and cannot go to the expense and trouble of hiring a type of endless-track system which involves at least two separate driving lines or shafts. Accordingly, development of a single, unitary-shaft drive unit for a tractor-wagon or truck cab-trailer system represents a highly desirable result. After extended investigation, I have developed just such a drive unit.

SUMMARY OF THE INVENTION

In its broader aspects my invention involves a drive unit made up of a power take-off or ground take-off unit conventionally connected to the driving mechanism or gear mechanism of a truck or like cab or tractor which is linked substantially directly through a single unitary drive shaft to a differential located between the two rear wheels of a following load-carrying trailer or wagon. By truck or like cab or tractor I mean any pulling unit. By following load-carrying trailer or wagon I mean any unit adapted to follow behind a truck or like cab or tractor pulling unit, for example, a disc, manure spreader or other farm implement, or the like. According to my preferred embodiment, the respective units linking the ground take-off to the rear differential, from front to rear, comprise, in respective order, an output shaft, a connecting sleeve, a swivel-type coupling of some kind such as a universal joint, a telescopic shaft permitting flexing of the drive shaft such that the trailer or wagon will follow the contour or path of the tractor or truck cab in front, a second swivel-type coupling, a pillow block bearing, and a third swivel-type coupling.

BRIEF DESCRIPTION OF THE DRAWING

For a better understanding of my invention, reference will now be made to the drawing which forms a part hereof.

In the drawing, a top view of the wagon, is depicted generally a trailer driving unit 10 such as that of the invention having a double universal telescopic assembly (splined) 12 made up of a front universal joint 14 connected to a back universal joint 16, the latter leading via a rod driveshaft 18 (for example, of one inch diameter) and pillow block bearing 20 to a rear universal joint 22, which is associated with a differential 24, an integral part of a wagon or trailer, represented generally by 26, which has wheels 28a, 28b, 28c and 28d. The whole unit operates in a manner such that the trailer or wagon being pulled turns through the same course followed by the tractor which pulls it. Double universal telescopic assembly (splined) 12 operates from a ground takeoff unit 30 of a pulling tractor (not shown) through an output shaft 32 having a connecting sleeve 34.

DESCRIPTION OF THE PREFERRED EMBODIMENT

While the invention has been described in terms of preferred embodiments, the claims appended hereto are intended to encompass all embodiments which fall within the spirit of the invention.

Having thus described my invention and certain preferred embodiments thereof, I claim:

1. A four wheel front and rear axle trailer driving unit the front wheels of which are steerable by a towing draft connection to a pulling vehicle comprising a single jointed drive shaft linking together a ground take-off unit at the rear of said pulling vehicle with a rear differential positioned substantially half-way between the two wheels of the rear axle of said trailer which follows or runs behind said pulling vehicle, said single jointed drive shaft having a pillow block bearing providing support and a linkage of a first universal joint forward of said front axle and a second universal joint forward of said rear axle enabling said trailer to be driven by, steered with and follow the contour of the pulling vehicle at substantially the same speed or gear at which the pulling vehicle is moving.

2. The unit of claim 1 wherein the components of the single jointed drive shaft comprise, from front to rear between said ground take-off unit and said rear differential, an output shaft, a connecting sleeve, an additional universal joint, a telescopic shaft, said first universal joint, said pillow-block bearing, and said second universal joint.

3. The unit of claim 2 wherein the single jointed drive shaft extends from front to rear first over a front axle portion of a frame connecting the two front wheels with the two rear wheels and a rear axle portion and then under said frame and said rear differential is located substantially directly beneath said rear axle portion.

4. The drive unit of claim 3 wherein the connecting sleeve and the additional universal joint are positioned just to the rear of the ground take-off unit, the telescopic shaft is positioned between the ground take-off unit and said front axle, the first universal joint and the pillow-block bearing are positioned substantially in the area of the front two wheels between same, and the second universal joint is positioned in the vicinity of the rear differential somewhat in front of it.

* * * * *